United States Patent
Guan et al.

(10) Patent No.: US 12,222,868 B2
(45) Date of Patent: Feb. 11, 2025

(54) PROCESSOR AND OPERATING METHOD FOR A HOMOGENEOUS DUAL COMPUTING SYSTEM

(71) Applicant: Shanghai Zhaoxin Semiconductor Co., Ltd., Shanghai (CN)

(72) Inventors: Yingbing Guan, Shanghai (CN); Zhenhua Huang, Beijing (CN); Yanting Li, Beijing (CN); Yipu Liu, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 28 days.

(21) Appl. No.: 18/467,901

(22) Filed: Sep. 15, 2023

(65) Prior Publication Data
US 2024/0176746 A1     May 30, 2024

(30) Foreign Application Priority Data
Nov. 25, 2022  (CN) ......................... 202211490770.X

(51) Int. Cl.
G06F 12/00     (2006.01)
G06F 12/084    (2016.01)
G06F 12/0891   (2016.01)

(52) U.S. Cl.
CPC ........ G06F 12/0891 (2013.01); G06F 12/084 (2013.01)

(58) Field of Classification Search
CPC .............. G06F 12/0891; G06F 12/084; G06F 12/0844; G06F 12/10; G06F 12/14; G06F 13/1663; G06F 13/1689; G06F 3/062
See application file for complete search history.

(56) References Cited

U.S. PATENT DOCUMENTS

| 8,145,902 B2 * | 3/2012 | Hatakeyama | G06F 21/71 713/161 |
| 2004/0158681 A1 * | 8/2004 | Hooker | G06F 9/3017 711/143 |

FOREIGN PATENT DOCUMENTS

| CN | 111221775 A | 6/2020 |
| CN | 115905099 A | 4/2023 |

OTHER PUBLICATIONS

Ex Parte Quayle Action dated Jan. 31, 2024, issued in U.S. Appl. No. 18/048,535 (copy not provided).

* cited by examiner

*Primary Examiner* — Shawn X Gu
(74) *Attorney, Agent, or Firm* — McClure, Qualey & Rodack, LLP

(57) ABSTRACT

A processor for building a homogeneous dual computing system is shown. The processor has a trusted core, a normal core, and a shared cache. The trusted core has an access right to an isolated storage space of a system memory. The normal core is homogeneous with the trusted core, and is prohibited from accessing the isolated storage space. In response to a cache flush instruction issued by the normal core, the trusted core initiates and executes a second cache write-back instruction that is different from the first cache write-back instruction. According to the second cache write-back instruction, isolated data associated with the isolated storage space and cached in the shared cache is written back to the isolated storage space before being flushed.

18 Claims, 6 Drawing Sheets

PROCESSOR AND OPERATING METHOD FOR A HOMOGENEOUS DUAL COMPUTING SYSTEM

CROSS REFERENCE TO RELATED APPLICATIONS

This application claims priority of China Patent Application No. 202211490770.X, filed on Nov. 25, 2022, the entirety of which is incorporated by reference herein.

BACKGROUND

Technical Field

The present disclosure relates to trusted computing.

Description of the Related Art

Trusted computing improves computing security through hardware division. For example, a computer's system memory may be partitioned to provide an isolated storage space. Only the authorized trusted platform is permitted to access it.

How to really protect the isolated data maintained in the isolated storage space is an important issue in this technical field.

BRIEF SUMMARY

A homogeneous dual computing system is shown, which uses two homogeneous cores within the same processor to provide trusted computing and normal computing. The core for trusted computing is named trusted core. The core for normal computing is named normal core. On the shared cache (e.g., a last-level cache that is named LLC) between the normal core and the trusted core, there may be some isolated data that only the trusted core is permitted to access. The disclosure especially proposes a protection scheme for the isolated data cached on the shared cache. In particular, the present disclosure protects the cached isolated data from being deleted by cache flush operations that are initiated and executed by the normal core.

A processor in accordance with an exemplary embodiment of the disclosure has a trusted core, a normal core, and a shared cache. The trusted core has an access right to the isolated storage space of a system memory. The normal core is homogeneous with the trusted core, and is prohibited from accessing the isolated storage space. The shared cache is shared by the trusted core and the normal core. In response to a cache flush instruction issued by the normal core, the trusted core initiates and executes a second cache write-back instruction, which is different from the first cache write-back instruction. According to the second cache write-back instruction, isolated data associated with the isolated storage space and cached in the shared cache is written back to the isolated storage space before being flushed. Different from the second cache write-back instruction, the first cache write-back instruction is called to write all cache lines of the shared cache back to the system memory.

In an exemplary embodiment, according to the second cache write-back instruction, the shared cache polls all cache lines of the shared cache to perform isolated data identification by determining whether the system memory address of each cache line falls into the address range of the isolated storage space.

In an exemplary embodiment, in response to the cache flush instruction, the normal core gains ownership of the processor, and notifies the trusted core to initiate and execute the second cache write-back instruction. After completing the second cache write-back instruction, the trusted core notifies the normal core that the isolated data cached in the shared cache has been written back to the isolated storage space In an exemplary embodiment, the normal core issues an inter processor interrupt to notify the trusted core to initiate and execute the second cache write-back instruction. After completing the second cache write-back instruction, the trusted core issues an interrupt for isolated data write-back synchronization with the normal core, to notify the normal core that the isolated data cached in the shared cache has been written back to the isolated storage space. After the isolated data write-back synchronization, the normal core acknowledges the trusted core, and the normal core and the trusted core perform a first cache flush synchronization. After the first cache flush synchronization, the normal core flushes the shared cache. After flushing the shared cache, the normal core notifies the trusted core to perform second cache flush synchronization together. After the second cache flush synchronization, the normal core and the trusted core separately flush their in-core cache modules. After the normal core and the trusted core separately flush their in-core cache modules, the normal core and the trusted core perform third cache flush synchronization, as acknowledgement that the first in-core cache module and the second in-core cache module have been flushed. After the third cache flush synchronization, the normal core notifies a chipset in a special cycle that the flushing of the cache system that includes the shared cache, the first in-core cache module, and the second in-core cache module is completed. After the special cycle, the normal core releases ownership of the processor.

Based on the aforementioned concept, a method for operating a homogeneous dual computing system is shown. The method includes planning a processor with multiple cores to provide a trusted core that has an access right to an isolated storage space of a system memory, and a normal core which is homogeneous with the trusted core and is prohibited from accessing the isolated storage space. The trusted core and the normal core share a shared cache. In response to a cache flush instruction issued by the normal core, the method includes operating the trusted core to initiate and execute the second cache write-back instruction that is different from a first cache write-back instruction. According to the second cache write-back instruction, the method includes writing isolated data associated with the isolated storage space and cached in the shared cache back to the isolated storage space before flushing of the isolated data cached in the shared cache.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION

The following description is made for the purpose of illustrating the general principles of the disclosure and should not be taken in a limiting sense. The scope of the disclosure is best determined by reference to the appended claims.

Figure 1:
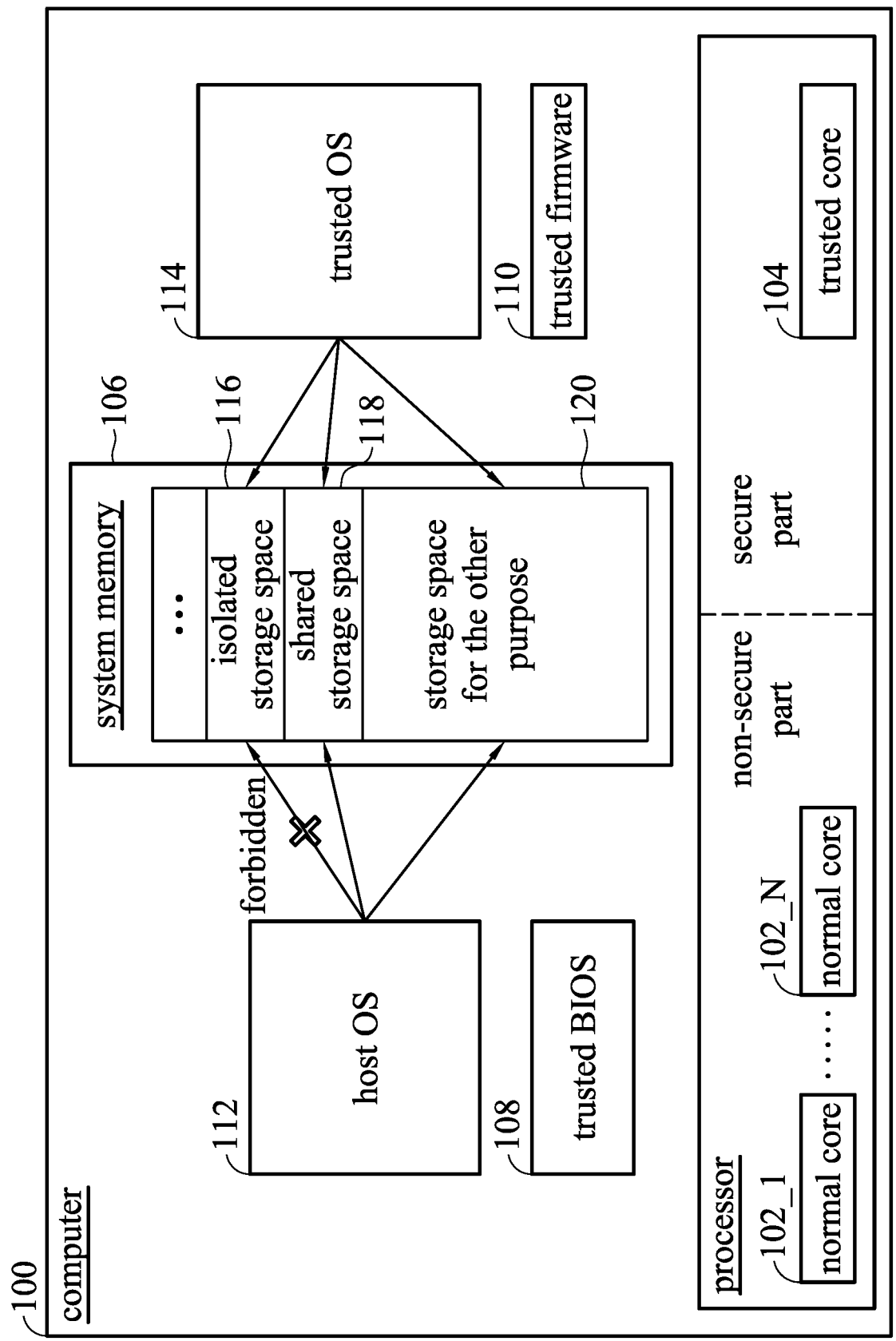
FIG. 1 illustrates the concept of an isolated storage space.

FIG. 1 illustrates the concept of an isolated storage space. A computer 100 with trusted computing capability includes a plurality of normal cores 102_1~102_N (N is a number), a trusted core 104, and a system memory (such as dynamic random access memory DRAM . . . etc.) 106. Corresponding to the hardware architecture, the computer 100 runs a trusted basic input output system (trusted BIOS) 108 and a trusted firmware 110. One of the cores 102_1 . . . 102_N is selected as a master core, which works as a boot strap processor (BSP for short) to load and run a host operating system (host OS) 112. The trusted core 104 runs a trusted operating system (trusted OS) 114. The system memory 106 is partitioned to provide an isolated storage space 116, a shared storage space 118, and a storage space 120 for the other purpose. As shown, the isolated data stored in the isolated storage space 116 is accessible to the trusted operating system 114 but is prohibited from being accessed by the host operating system 112. The normal core running the host operating system 112 can communicate with the trusted core 104 through the shared storage space 118. The storage space 120 is planned for the internal calculations of the normal cores 102_1 . . . 102_N. In some situations (for example, read only without writing), the trusted core 104 may also use the storage space 120 for internal calculations.

In particular, the normal cores 102_1 . . . 102_N, and the trusted core 104 proposed in the disclosure are the different cores of the same processor. The computer system constructed in this way is called a homogeneous dual computing system. The architecture of the trusted core 104 is the same as that of any of the normal cores 102_1 . . . 102_N. In the homogeneous dual computing system, the trusted core 104 and the normal cores 102_1 . . . 102_N use a shared cache. The shared cache may cache not only the non-isolated data, but also the isolated data. How to manage the shared cache is an important topic.

The processor may be a single-die processor, wherein the trusted core 104 and the normal cores 102_1 . . . 102_N are fabricated in the same die. Generally, the core with the largest core number in the single die is the trusted core 104 in default. Or, the trusted core 104 may be selected according to the core number designated by the manufacturer.

Figure 2A:
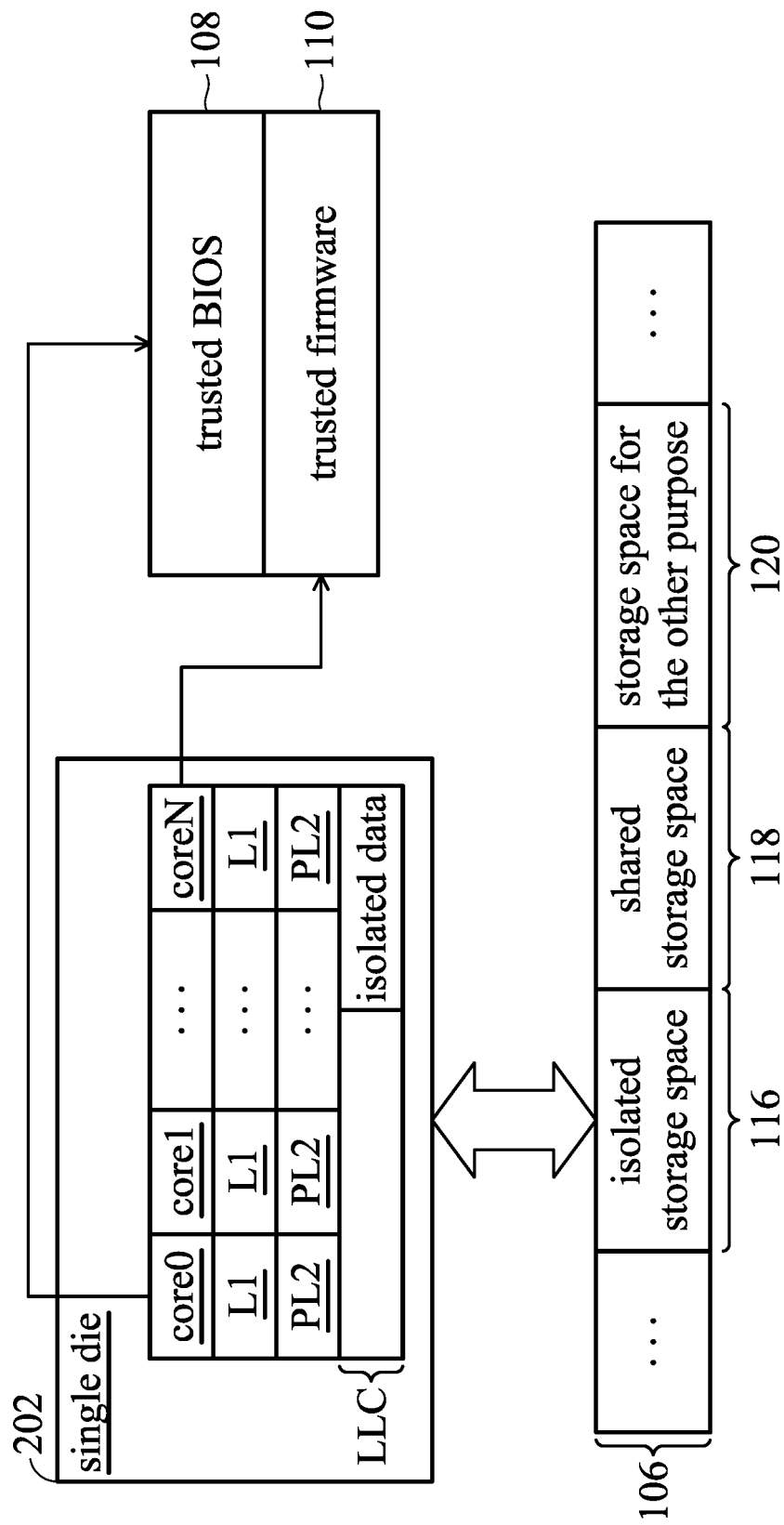
FIG. 2A illustrates a homogeneous dual computing system implemented by a single-die processor 202 in accordance with an exemplary embodiment of the disclosure.

FIG. 2A illustrates a homogeneous dual computing system implemented by a single-die processor 202 in accordance with an exemplary embodiment of the disclosure. As shown, the single-die processor 202 has several cores core0~coreN. The cores core0~coreN each has an in-core cache module (e.g., including a first-level cache L1 and a second-level cache PL2), and the different cores core0~coreN share the last-level cache LLC. Through the host interconnection fabric (HIF for short), the cores core0~coreN access the system memory 106. In this example, the core coreN is selected as the trusted core 104 to run the trusted firmware 110. The remaining cores core0~coreN−1 are the above-mentioned normal cores 102_# (# is a number), among which core0 is used as the master core (BSP) running the trusted BIOS 108. The last level cache LLC is the shared cache between the normal cores core0 . . . coreN−1 and the trusted core coreN.

In the system memory 106, the isolated data stored in the isolated storage space 116 may be cached into the last level cache LLC, which is accessible to the trusted core coreN but may be flushed by a cache flush instruction (INVD instruction) issued by the normal cores core0 . . . coreN−1. A solution to this problem is proposed in this disclosure.

In another exemplary embodiment, the processor is a multi-die processor. Each die has multiple cores; one is tentatively planned as an on-die trusted core and another one is tentatively planned as an on-die master core (BSP). Thus, a secure link among the dies/sockets is established. After being linked together, all dies are unified to provide a system trusted core and a system master core. A trusted operating system is loaded onto the system trusted core and run by the system trusted core, and a host operating system is loaded onto the system master core and run by the system master core. Generally, the core with the largest core number in the die with the largest die number is selected as the system trusted core. In another exemplary embodiment, the system trusted core is set to meet the manufacturer's requirement. The system trusted core and the system master core may be provided by the different dies, or may be provided by the same die.

Figure 2B:
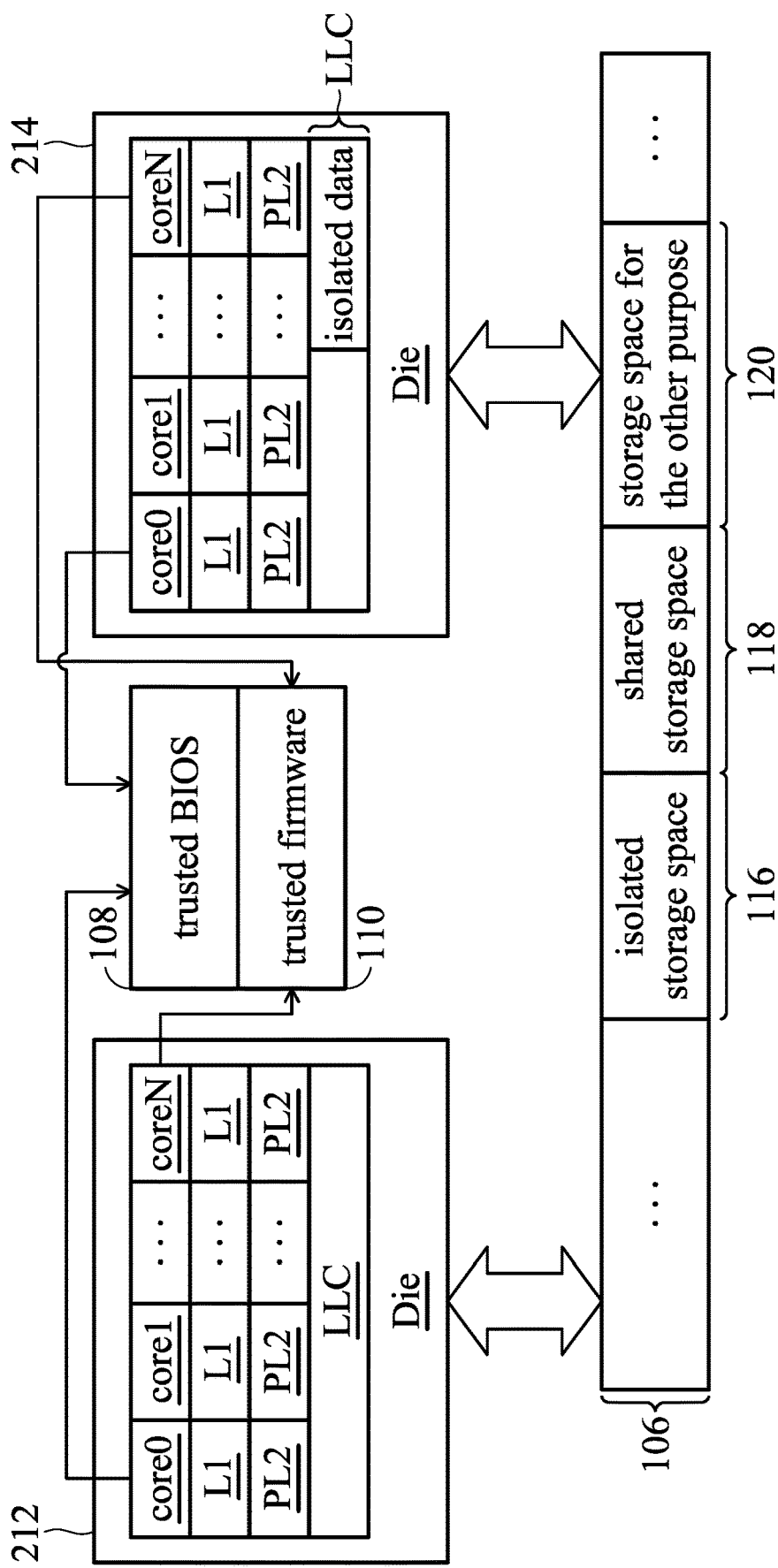
FIG. 2B illustrates a dual-die processor for implementing a homogeneous dual computing system in accordance with an exemplary embodiment of the disclosure.

FIG. 2B illustrates a dual-die processor for implementing a homogeneous dual computing system in accordance with an exemplary embodiment of the disclosure. The dual dies 212 and 214 implementing the processor each have multiple cores core0~coreN. Before being linked together, the initialization of the die 212 has to be independent from the initialization of the die 214. The die 212 temporarily uses its core coreN as its on-die trusted core to run the trusted firmware 110, and temporarily uses its core core0 as the on-die master core (BSP) to run the trusted BIOS 108 to establish the link between dies/sockets. The die 214 temporarily uses its core coreN as its on-die trusted core to run the trusted firmware 110, and temporarily uses its core core0 as the on-die master core (BSP) to run the trusted BIOS 108 to establish the link between dies/sockets. In this way, the link between the dies 212 and 214 is established. The core core0 on the die 212 is selected as the system master core to load and run the host operating system, and the core coreN on the die 214 is selected as the system trusted core to load and run the trusted operating system. On the die 214, the last level cache LLC is the shared cache shared between the normal cores core0~coreN−1 and the system trusted core coreN.

In the system memory 106, the isolated data stored in the isolated storage space 116 may be cached in the last level cache LLC of the die 214, which is accessible to the system trusted core (coreN on the die 214), but may be flushed by a cache flush instruction (INVD instruction) issued by the normal cores core0 . . . coreN−1 on the die 214. A solution to this problem is proposed in this disclosure.

Compared with the first cache write-back instruction used in the conventional technology, the present invention proposes a second cache write-back instruction. The first cache write-back instruction is usually denoted as WBINVD, which is executed to write all cached data back to a system memory and then flush the cache system (e.g., invalidate all cached data). Hereinafter, the second cache write-back instruction proposed in the disclosure is labeled as WBINVD_S. A normal core that shares a shared cache with a trusted core may issue a cache flush instruction INVD. In response to the cache flush instruction INVD, the trusted core initiates and executes the second cache write-back instruction WBINVD_S. According to the second cache write-back instruction WBINVD_S, the cached isolated data is written back to the isolated storage space and is protected from being flushed without being written back first.

Figure 3:
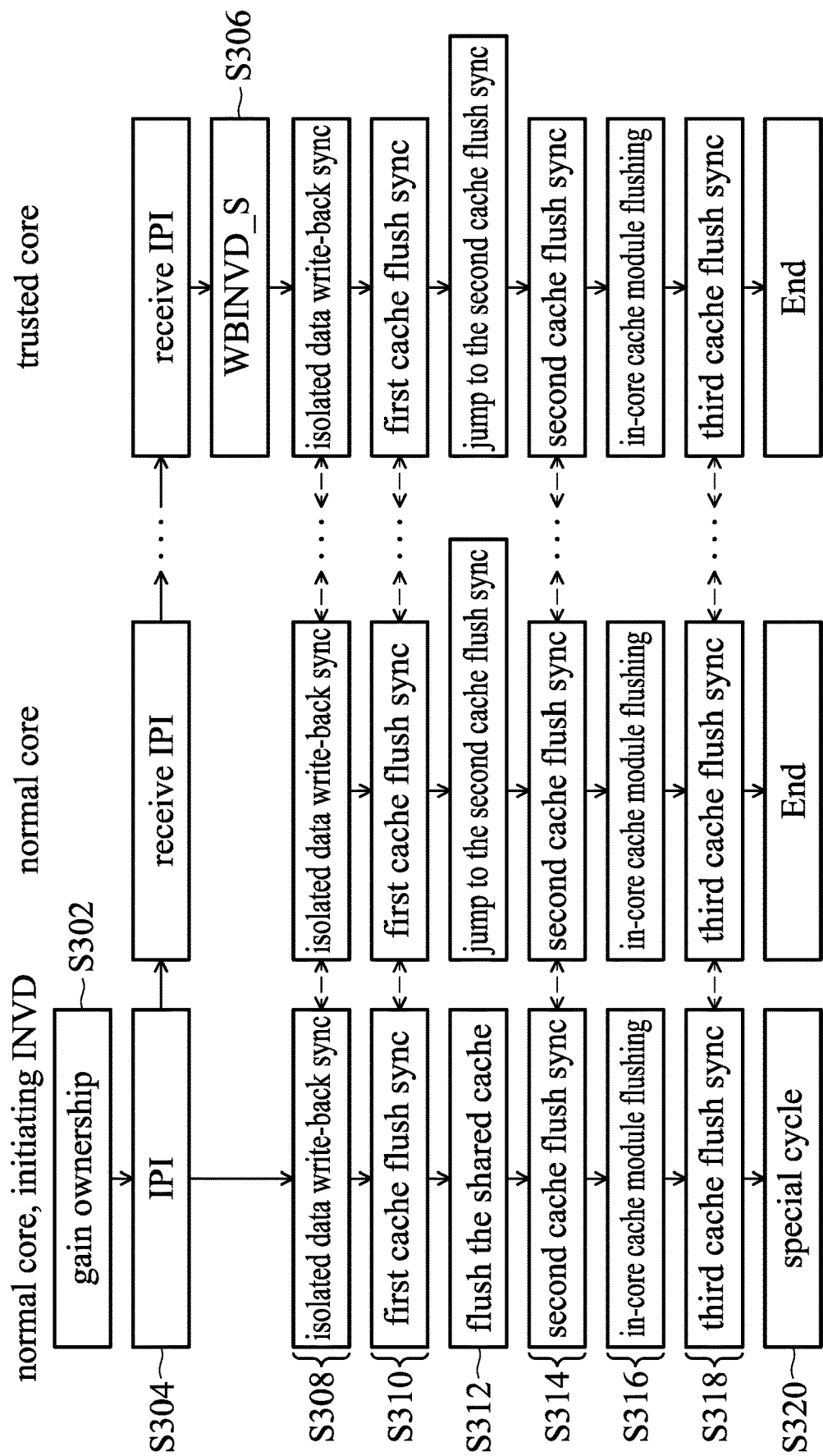
FIG. 3 illustrates the actions of each core in response to a cache flush instruction INVD issued by a normal core in accordance with an exemplary embodiment of the disclosure.

FIG. 3 illustrates the actions of each core in response to a cache flush instruction INVD issued by a normal core in accordance with an exemplary embodiment of the disclosure. The rightmost column in the diagram shows the actions of the trusted core, and the left columns correspond to the normal core that issues the cache flush instruction INVD and the remaining normal cores. All the normal cores use a shared cache with the trusted core.

In step S302, the normal core that issues the cache flush instruction INVD gains ownership of the processor, which is referred to as the master core hereinafter. Some resources of the processor are shared by multiple cores. The core gains the ownership is permitted to use the shared resources. In this way, the shared resources are not accessed by multiple cores at the same time. Errors are reduced. For example, when two cores request to program the shared resource, the core with the ownership can program the shared resource prior to the other core. For example, the instruction "request for ownership" may make the shared cache tentatively exclusive to the core.

In step S304, the master core issues an inter processor interrupt, and the other cores receive the inter processor interrupt.

In step S306, in response to the inter processor interrupt received from the master core, the trusted core initiates and executes the second cache write-back instruction WBINVD_S of the disclosure. The cached isolated data is written back to the isolated storage space of the system memory, preventing the isolated data from being flushed without being written back to the isolated storage space first.

In step S308, the trusted core synchronizes with the normal cores who share the shared cache with the trusted core (which is called isolated data write-back synchronization), which means that the second cache write-back instruction WBINVD_S has been completed. Every core thus knows that the isolated data has been safely written back to the isolated storage space.

In step S310, all cores perform a first cache flush synchronization to ensure that all cores are ready for cache flushing.

In step S312, the master core flushes the shared cache (for example, the last level cache LLC), and may directly invalidate the cache lines therein. The remaining normal cores and trusted cores skip to the next synchronization procedure.

In step S314, all cores perform second cache flush synchronization, which means that the cache flushing of the shared cache (LLC) is completed.

In step S316, all cores flush their in-core cache modules.

In step S318, all cores perform third cache flush synchronization, which means that flushing of all in-core caches modules is completed.

In step S320, the master core notifies a chipset in a special cycle that flushing of the whole cache system (including the shared cache LLC, and the in-core cache modules of the different cores) is completed In step S322, the master core releases ownership of the processor. For example, the shared cache tentatively exclusive to this core is released.

The technique shown in FIG. 3 prevents the isolated data cached in the cache system from being lost due to a cache flush instruction issued by a normal core that also use the shared cache.

Figure 4:
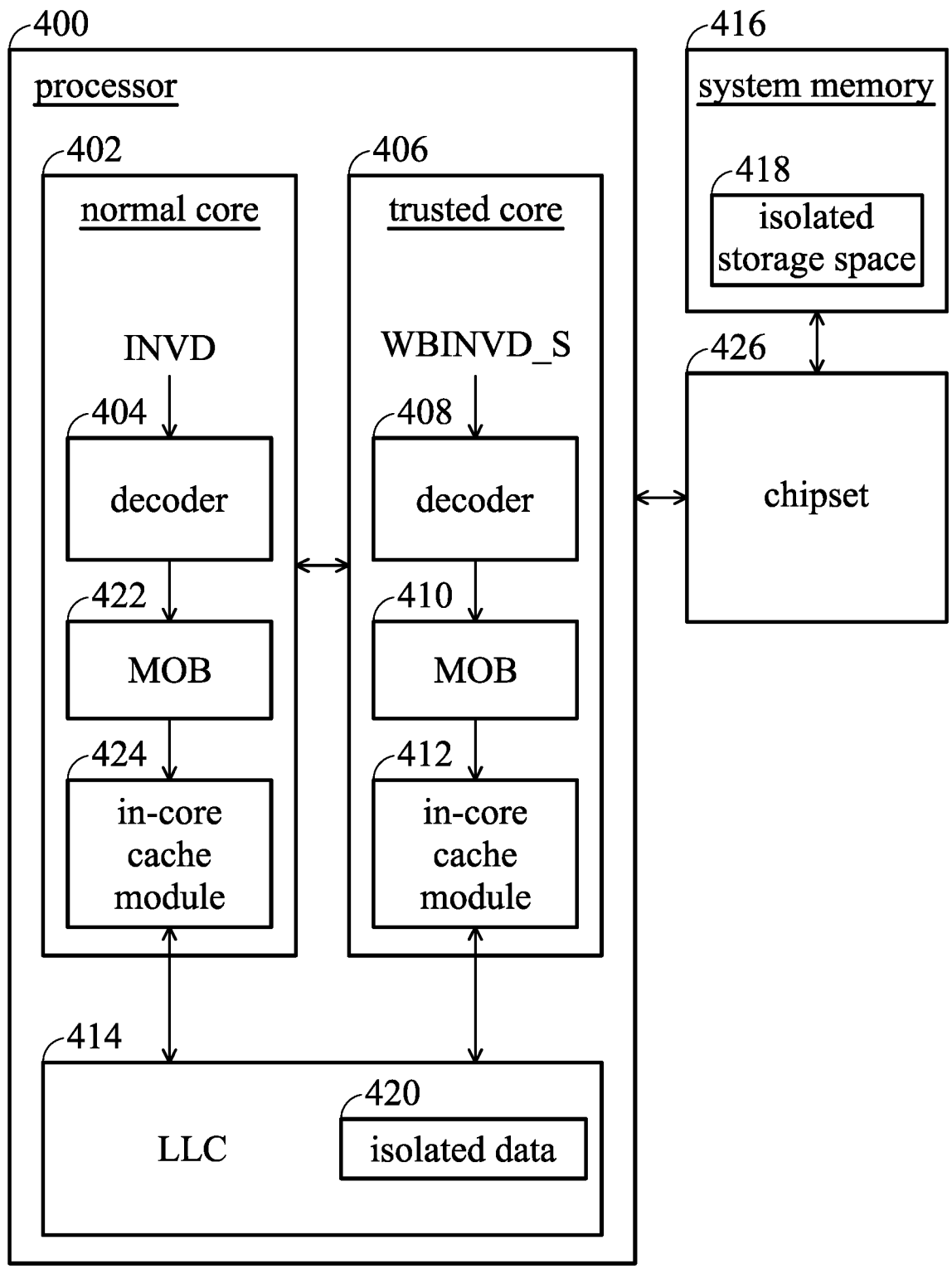
FIG. 4 illustrates how the hardware of the processor 400 operates in response to the cache flush instruction INVD issued by the normal core 402 in accordance with an exemplary embodiment of the disclosure.

FIG. 4 illustrates how the hardware of the processor 400 operates in response to the cache flush instruction INVD issued by the normal core 402 in accordance with an exemplary embodiment of the disclosure. For simplicity, the illustration simply shows one normal core. In practice (as shown in FIG. 2A and FIG. 2B), the processor may have more than two cores, or multiple dies providing multiple cores. As described in FIGS. 2A and 2B, after the link between the dies/sockets is established after the power-on of the system, the entire system will have only one trusted core (called the system trusted core), and the rest are normal cores. FIG. 4 simply illustrates the trusted core and normal core.

The cache flush instruction INVD issued by the normal core 402 is decoded by the decoder 404, and the normal core 402 issues an inter processor interrupt to notify the trusted core 406. In response to the inter processor interrupt, the trusted core 406 issues the second cache write-back instruction WBINVD_S. The second cache write-back instruction WBINVD_S is decoded by the decoder 408. Through the memory order buffer (MOB for short) 410, the in-core cache module 412 is instructed to poll the cache lines in the last level cache 414. In particular, in response to the second cache write-back instruction WBINVD_S, the polling of the last level cache 414 is to find out the isolated data 420 associated with the isolated storage space 418 of the system memory 416.

In an exemplary embodiment, it is determined whether the system memory (416) address of each cache line falls into the address range of the isolated storage space 418. The found isolated data 420 will be written back to the isolated storage space 418 of the system memory 416. After writing back the isolated data 420 to the system memory 416, the trusted core 406 may issue an interrupt to synchronize the normal core 402 and the trusted core 406. The normal core 402 now is allowed to continue the cache flushing action. The normal core 402 can flush the last level cache 414 through the MOB 422 and the in-core cache module 424 and, accordingly, the data cached in the last level cache 414 is completely invalidated. Next, the normal core 402 and the trusted core 406 can flush their in-core cache modules 424 and 412, respectively, to completely invalidate the cached contents in the in-core cache modules 424 and 412. In a special cycle, the core 402 may notify the chipset 426 that the cache flushing is completed.

Figure 5:
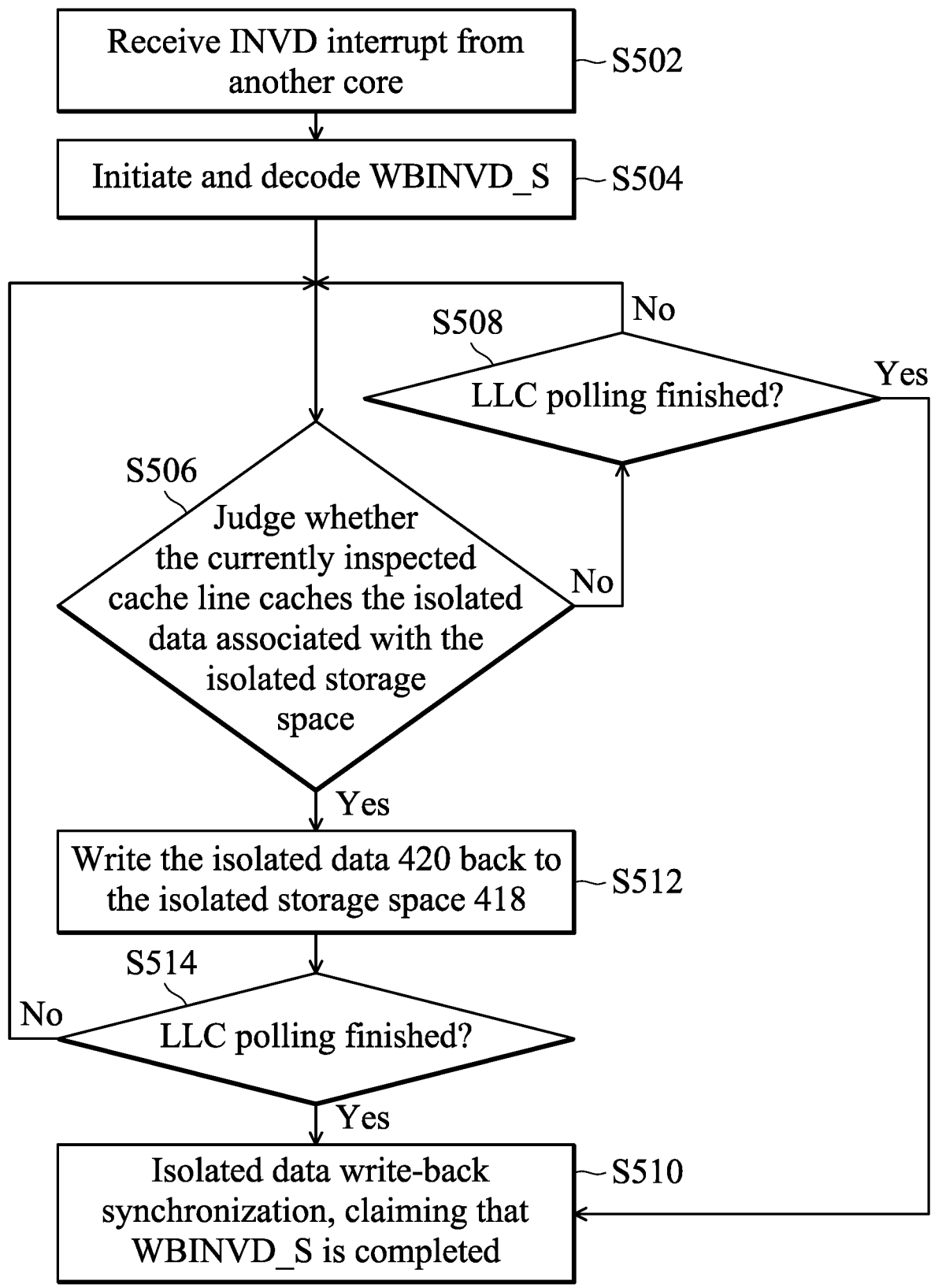
FIG. 5 is a flowchart illustrating how the trusted core 406 initiates and executes the second cache write-back flush instruction WBINVD_S in accordance with an exemplary embodiment of the disclosure.

FIG. 5 is a flowchart illustrating how the trusted core 406 initiates and executes the second cache write-back flush instruction WBINVD_S in accordance with an exemplary embodiment of the disclosure.

In step S502, the trusted core 406 receives an inter processor interrupt, wherein the inter processor interrupt is issued by another core (the normal core 402 using a shared cache that is shared with the trusted core 406) due to the execution of a cache flush instruction INVD initiated by the normal core 402.

In step S504, the trusted core 406 initiates and decodes the second cache write-back flush instruction WBINVD_S. Then, in response to the second cache write-back flush instruction WBINVD_S executed by the trusted core 406, the shared cache (414) polls all of its cache lines.

In step S506, the shared cache (414) polls its cache lines, and judges (by address determination) whether the currently inspected cache line caches the isolated data associated with the isolated storage space 418 on the system memory 416. If not, the shared cache (414) determines in step S508 whether the polling of the shared cache (414) is finished. If there are still unconfirmed cache lines, the procedure returns to step S506. If all the cache lines of the shared cache (414) have been confirmed, the trusted core 406 initiates isolated data write-back synchronization in step S510, and notifies the normal core 402 that the second cache write-back flush instruction WBINVD_S is completed.

If it is determined in step S506 that the currently inspected cache line is isolated data associated with the isolated storage space 418 of the system memory 416, the trusted core 406 writes the isolated data (e.g., 420) back to the isolated storage space 418 in step S512. Next, the shared cache (414) judges in step S514 whether the polling of the shared cache 414 is finished. If there are still unconfirmed cache lines, the procedure returns to step S506. If all the cache lines of the shared cache 414 have been confirmed, the trusted core 406 initiates isolated data write-back synchronization in step S510, to notify the normal core 402 that the second cache write-back flush instruction WBINVD_S is completed.

Different from the second cache write-back flush instruction WBINVD_S of the disclosure, the first cache write-back flush instruction WBINVD is spontaneously initiated by the trusted core 406 to write back all cached contents to the system memory 416 and then flushes the whole cache system. In the shared cache 414, data other than the isolated data 420 is also written back to the system memory 416.

In an exemplary embodiment, the trusted core 406 uses a new flag field to distinguish the first cache write-back flush instruction WBINVD (spontaneously initiated by the trusted core 406) from the second cache write-back flush instruction WBINVD_S initiated by an inter processor interrupt issued by another core due to the cache flush instruction INVD.

The microcode provided by the normal core 402 for the execution of the cache flush instruction INVD needs to have the ability to issue an interrupt to the trusted core 406 to drive the trusted core 406 to initiate the second cache write-back flush instruction WBINVD_S.

The trusted core 406 also needs to design a microcode for the execution of the second cache write-back flush instruction WBINVD_S to write the isolated data 420 cached in the shared cache 414 back to the system memory 416.

Based on the aforementioned concept, a method for operating a homogeneous dual computing system is shown. The method includes planning a processor with multiple cores to provide a trusted core that has an access right to the isolated storage space of a system memory, and a normal core which is homogeneous with the trusted core and is prohibited from accessing the isolated storage space. The trusted core and the normal core share a shared cache. In response to a cache flush instruction issued by the normal core, the trusted core is operated to initiate and execute the second cache write-back instruction that is different from a first cache write-back instruction. According to the second cache write-back instruction, isolated data associated with the isolated storage space and cached in the shared cache is written back to the isolated storage space before the isolated data that is cached in the shared cache is flushed.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A processor for building a homogeneous dual computing system, comprising:
   a trusted core, having an access right to an isolated storage space of a system memory;
   a normal core, which is homogeneous with the trusted core, and is prohibited from accessing the isolated storage space; and
   a shared cache, shared by the trusted core and the normal core;
   wherein:
   in response to a cache flush instruction issued by the normal core, the trusted core initiates and executes a second cache write-back instruction that is different from a first cache write-back instruction, according to the second cache write-back instruction, isolated data associated with the isolated storage space and cached in the shared cache is written back to the isolated storage space before being flushed; and
   wherein instead of responding to the cache flush instruction issued by the normal core as the second cache write-back instruction, the first cache write-back instruction is called to write all cache lines of the shared cache back to the system memory.

2. The processor as claimed in claim 1, wherein:
   according to the second cache write-back instruction, the shared cache polls all cache lines of the shared cache to perform isolated data identification by determining whether a system memory address of each cache line falls into an address range of the isolated storage space.

3. The processor as claimed in claim 1, wherein:
   the normal core has a first in-core cache module;
   the trusted core includes a second in-core cache module; and
   when executing the cache flush instruction, the normal core flushes the shared cache prior to flush the first in-core cache module and the second in-core cache module.

4. The processor as claimed in claim 1, wherein:
   in response to the cache flush instruction, the normal core gains ownership of the processor, and notifies the trusted core to initiate and execute the second cache write-back instruction; and
   after completing the second cache write-back instruction, the trusted core notifies the normal core that the isolated data cached in the shared cache has been written back to the isolated storage space.

5. The processor as claimed in claim 4, wherein:
   the normal core issues an inter processor interrupt to notify the trusted core to initiate and execute the second cache write-back instruction;
   after completing the second cache write-back instruction, the trusted core issues an interrupt for isolated data write-back synchronization with the normal core, to inform the normal core that the isolated data cached in the shared cache has been written back to the isolated storage space;

after the isolated data write-back synchronization, the normal core acknowledges the trusted core, and the normal core and the trusted core perform a first cache flush synchronization; and after the first cache flush synchronization, the normal core flushes the shared cache.

6. The processor as claimed in claim 5, wherein:

after flushing the shared cache, the normal core notifies the trusted core to perform second cache flush synchronization together; and after the second cache flush synchronization, the normal core flushes its first in-core cache module, and the trusted core flushes its second in-core cache module.

7. The processor as claimed in claim 6, wherein:

after the normal core flushes its first in-core cache module and the trusted core flushes its second in-core cache module, the normal core and the trusted core perform third cache flush synchronization, as acknowledgement that the first in-core cache module and the second in-core cache module have been flushed.

8. The processor as claimed in claim 7, wherein:

after the third cache flush synchronization, the normal core notifies a chipset in a special cycle that flushing of a cache system including the shared cache, the first in-core cache module, and the second in-core cache module is completed.

9. The processor as claimed in claim 8, wherein:

after the special cycle, the normal core releases ownership of the processor.

10. A method for operating a homogeneous dual computing system, comprising:

planning a processor with multiple cores to provide a trusted core that has an access right to an isolated storage space of a system memory, and a normal core which is homogeneous with the trusted core and is prohibited from accessing the isolated storage space, wherein the trusted core and the normal core share a shared cache; and in response to a cache flush instruction issued by the normal core, operating the trusted core to initiate and execute a second cache write-back instruction that is different from the first cache write-back instruction, wherein instead of responding to the cache flush instruction issued by the normal core as the second cache write-back instruction, the first cache write-back instruction is executed to write all cache lines of the shared cache back to the system memory; and according to the second cache write-back instruction, writing isolated data associated with the isolated storage space and cached in the shared cache back to the isolated storage space before flushing of the isolated data cached in the shared cache.

11. The method as claimed in claim 10, further comprising:

according to the second cache write-back instruction, operating the shared cache to poll all cache lines of the shared cache to perform isolated data identification by determining whether a system memory address of each cache line falls into an address range of the isolated storage space.

12. The method as claimed in claim 10, wherein:

the normal core has a first in-core cache module;

the trusted core includes a second in-core cache module; and when executing the cache flush instruction, the normal core flushes the shared cache prior to flush the first in-core cache module and the second in-core cache module.

13. The method as claimed in claim 10, wherein:

in response to the cache flush instruction, the normal core gains ownership of the processor, and notifies the trusted core to initiate and execute the second cache write-back instruction; and after completing the second cache write-back instruction, the trusted core notifies the normal core that the isolated data cached in the shared cache has been written back to the isolated storage space.

14. The method as claimed in claim 13, wherein:

the normal core issues an inter processor interrupt to notify the trusted core to initiate and execute the second cache write-back instruction;

after completing the second cache write-back instruction, the trusted core issues an interrupt for isolated data write-back synchronization with the normal core, to inform the normal core that the isolated data cached in the shared cache has been written back to the isolated storage space;

after the isolated data write-back synchronization, the normal core acknowledges the trusted core, and the normal core and the trusted core perform a first cache flush synchronization; and after the first cache flush synchronization, the normal core flushes the shared cache.

15. The method as claimed in claim 14, wherein:

after flushing the shared cache, the normal core notifies the trusted core to perform second cache flush synchronization together; and after the second cache flush synchronization, the normal core flushes its first in-core cache module, and the trusted core flushes its second in-core cache module.

16. The method as claimed in claim 15, wherein:

after the normal core flushes its first in-core cache module and the trusted core flushes its second in-core cache module, the normal core and the trusted core perform third cache flush synchronization, as acknowledgement that the first in-core cache module and the second in-core cache module have been flushed.

17. The method as claimed in claim 16, wherein:

after the third cache flush synchronization, the normal core notifies a chipset in a special cycle that the flushing of a cache system including the shared cache, the first in-core cache module, and the second in-core cache module is completed.

18. The method as claimed in claim 17, wherein:

after the special cycle, the normal core releases ownership of the processor.

* * * * *